United States Patent
Eisele (10) Patent No.: US 8,935,072 B2
(45) Date of Patent: Jan. 13, 2015

(54) METHOD FOR DETERMINING THE SPEED OF A VEHICLE AND VEHICLE

(71) Applicant: GM Global Technology Operations LLC, Detroit, MI (US)

(72) Inventor: Harald Eisele, Wiesbaden (DE)

(73) Assignee: GM Global Technology Operations LLC, Detroit, MI (US)

(*) Notice: Subject to any disclaimer, the term of this patent is extended or adjusted under 35 U.S.C. 154(b) by 19 days.

(21) Appl. No.: 13/630,172

(22) Filed: Sep. 28, 2012

(65) Prior Publication Data

US 2013/0090830 A1     Apr. 11, 2013

(30) Foreign Application Priority Data

Sep. 28, 2011 (DE) .......................... 10 2011 115 668

(51) Int. Cl.
*B60T 8/32* (2006.01)
*G05D 1/00* (2006.01)
*G06F 7/00* (2006.01)
*G06F 17/00* (2006.01)
*B60K 31/00* (2006.01)
(Continued)

(52) U.S. Cl.
CPC ............... *G06F 17/00* (2013.01); *B60K 31/00* (2013.01); *B60T 7/12* (2013.01); *B60W 40/105* (2013.01); *B60W 2520/28* (2013.01); *B60W 2550/402* (2013.01); *B60W 2550/408* (2013.01)
USPC ..................................... 701/93; 701/1; 701/70

(58) Field of Classification Search
CPC ............ G06F 17/00; B60T 7/12; B60K 31/00
USPC .................................................. 701/93, 1, 70
See application file for complete search history.

(56) References Cited

U.S. PATENT DOCUMENTS 5,498,072 A * 3/1996 Shimizu ........................ 303/191
5,828,585 A * 10/1998 Welk et al. ...................... 702/96
(Continued)

FOREIGN PATENT DOCUMENTS

| DE | 1475250 A1 | 5/1969 |
|---|---|---|
| DE | 19625270 A1 | 1/1998 |

(Continued)

OTHER PUBLICATIONS

German Patent Office, German Search Report for Application No. 102011115668.6, dated Dec. 7, 2011.

*Primary Examiner* — Calvin Cheung
*Assistant Examiner* — Paula L Schneider
(74) *Attorney, Agent, or Firm* — Ingrassia Fisher & Lorenz, P.C.

(57) ABSTRACT

A subject matter of the application relates to a method for determining a speed of a vehicle. In one embodiment, the method includes ascertaining a first value of a distance traveled by the vehicle within a time interval on the basis of data ascertained by at least one first revolution sensor of a first tire of the vehicle and a second revolution sensor of a second tire of the vehicle; ascertaining a second value of a distance traveled by the vehicle within a time interval on the basis of data ascertained by a position-determining device; and comparing the ascertained first value and the ascertained second value. If a deviation between the ascertained first value and the ascertained second value exceeds a predetermined threshold value, the method includes classifying a speed determined on the basis of the ascertained second value.

13 Claims, 5 Drawing Sheets

(51) Int. Cl.
   *B60T 7/12*  (2006.01)
   *B60W 40/105*  (2012.01)

(56) References Cited

U.S. PATENT DOCUMENTS 5,847,645 A * 12/1998 Boesch .................. 340/442
7,187,273 B2   3/2007 Rieck et al.
7,751,962 B2 *  7/2010 Yamamura et al. ............. 701/93
2009/0299570 A1 12/2009 Kammann
2010/0262396 A1 10/2010 Kircher

FOREIGN PATENT DOCUMENTS

| DE | 10343070 A1 | 4/2005 |
| DE | 102006020490 A1 | 8/2007 |
| DE | 102006035597 A1 | 1/2008 |

* cited by examiner

METHOD FOR DETERMINING THE SPEED OF A VEHICLE AND VEHICLE

CROSS-REFERENCE TO RELATED APPLICATION

This application claims priority to German Patent Application No. 10 2011 115 668.6, filed Sep. 28, 2011, which is incorporated herein by reference in its entirety.

TECHNICAL FIELD

The technical field relates to a method for determining the speed of a vehicle, a vehicle, a computer program product and a computer-readable medium.

BACKGROUND

A method for determining a change in tire pressure is known from the EP 1 475 250 A1, which includes the steps of determining a first traveled distance d1 of the vehicle tire using a first calculating method, determining a second traveled distance d2 of the vehicle tire using a second calculating method, and calculating the difference between d1 and d2. The second calculating method comprises the steps of recording a GPS signal of a moving vehicle and calculating the second traveled distance d2 of the moving vehicle on the basis of the recorded GPS signal.

It is desirable to provide a method, a vehicle, a computer program product and a computer-readable medium for determining a speed of a vehicle which permits the vehicle to be operated in a further improved manner. In addition, other objects, desirable features and characteristics will become apparent from the subsequent summary and detailed description, and the appended claims, taken in conjunction with the accompanying drawings and this background.

SUMMARY

According to various aspects of the present disclosure, a method is provided for determining a speed of a vehicle. The method includes the following steps according to one aspect of the application ascertaining a first value of a distance which the vehicle has traveled within a time interval on the basis of data ascertained by at least one first revolution sensor of a first tire of the vehicle and a second revolution sensor of a second tire of the vehicle. The method includes ascertaining a second value of a distance which the vehicle has traveled within a time interval on the basis of data ascertained by a position-determining device. The method includes comparing the ascertained first value and the ascertained second value. If a deviation between the ascertained first value and the ascertained second value exceeds a predetermined threshold value, classifying a speed determined on the basis of the ascertained second value as the intrinsic speed of the vehicle. The method includes providing the determined speed to at least one driver-assistance-system of the vehicle.

The method according to the embodiment permits the vehicle to be operated in a further improved manner. This is accomplished by classifying the speed of the vehicle determined on the basis of the second value as the intrinsic speed of the vehicle, when the deviation between the ascertained first value and the ascertained second value exceeds the predetermined threshold value, and by providing the speed determined in this way to at least one driver assistance system of the vehicle. The application is based on the consideration that for such a discrepancy between the ascertained traveled distance values it can be concluded that the first ascertained value does not match the actually traveled distance and thus a speed determined on the basis of the ascertained first value does not correspond to the intrinsic speed of the vehicle. By providing the speed determined based on the ascertained second value to at least one driver assistance system it is advantageously possible for the driver assistance system to be operated, even in such situations, on the basis of the actual intrinsic speed of the vehicle. The method according to the embodiment, by ascertaining the first value on the basis of data from at least two revolution sensors of two tires, thus advantageously permits an erroneous first value to be recognised even in situations in which both tires, for example, due to a tire change, have a circumference or radius which differs from the value on which the calculation of the traveled distance was based.

With one embodiment of the method, at least one operating mode of at least one driver assistance system is adjusted as a function of the deviation between the ascertained first value and the ascertained second value. For example, the operation of at least one driver assistance system is restricted in case the deviation between the ascertained first value and the ascertained second value exceed the predetermined threshold value.

The at least one driver assistance system is selected from a parking aid system, a braking assistant, an emergency braking system, a cruise control system and a proximity control system. With the driver assistance systems mentioned, a thorough knowledge of the momentary intrinsic speed of the vehicle is especially important. Using the method for determining the speed of the vehicle, it is possible to avoid operating the driver assistance systems on the basis of a wrongly or inaccurately determined speed and it is also possible to prevent the driver assistance systems from being operated outside the envisaged speed ranges.

With a further embodiment, a warning message is also output in case the deviation between the ascertained first value and the ascertained second value exceed a predetermined threshold value. In addition or alternatively, a service unit may be notified in case the deviation between the ascertained first value and the ascertained second value exceeds the predetermined threshold value. Thus, in the first mentioned case, the passengers of the vehicle, in particular the driver of the vehicle, and in the second mentioned case an external servicing operation, in particular a garage, can be alerted to the fact that the tire circumference or radius is wrong and that correcting measures have to be taken.

The position-determining device can ascertain a position of the vehicle with the aid of a satellite, such as on the basis of GPS data. Furthermore, the position-determining device can ascertain a position of the vehicle additionally or alternatively on the basis of data received from a vehicle-to-infrastructure communication device. In the implementations mentioned the ascertaining the position of the vehicle and thus the second value of the distance traveled is carried out on the basis of data acquired from outside the vehicle. Thus, it is possible to check the distance traveled by means of the vehicle's own revolution sensors. This permits in a simple and reliable manner for finding out whether the calculation method for ascertaining the traveled vehicle distance is wrong or faulty.

With a further embodiment of the method, ascertaining the first value includes forming a mean value of the data ascertained by the at least one first revolution sensor and the second revolution sensor.

With a further embodiment, in which each of the tires of the vehicle comprises a revolution sensor, the first value is ascertained based on the data ascertained by the revolution sensors of the tires of the vehicle. As regards the first value, for example, this may include forming a mean value of all data ascertained by the revolution sensors.

Furthermore a bend and/or a width of a carriageway or lane traveled by the vehicle may be ascertained and the predetermined threshold value may be adjusted as a function of the ascertained bend and/or the ascertained width. This is based on the consideration that the parameters of the carriageway geometry can have an influence upon the ascertainment of the distance traveled. For example during driving through a bend a tire on the inside of the bend may comprise a rotational speed which is different from the rotational speed of a tire on the outside of the bend, whereby in such a situation different revolutions may be ascertained for the tires. By adjusting the predetermined threshold value as a function of the carriageway parameters such deviations can be taken into account to a further improved degree with the method for determining the speed of the vehicle.

The application also relates to a vehicle which comprises a first revolution sensor for a first tire and a second revolution sensor for a second tire of the vehicle. In addition, the vehicle comprises a first ascertainment device designed for ascertaining a first value of a distance of the vehicle traveled within a time interval on the basis of data ascertained from the at least one first revolution sensor and the second revolution sensor. Furthermore the vehicle comprises a second ascertainment device, which is designed for ascertaining a second value of a distance of the vehicle traveled within a time interval on the basis of data ascertained by a position-determining device. In addition, the vehicle comprises a comparison device which is designed for comparing the ascertained first value and the ascertained second value. In addition, the vehicle comprises a classification device designed for classifying the speed based on the ascertained second value as the intrinsic speed of the vehicle and which is also designed for providing the determined speed to at least one driver assistance system, in case a deviation between the ascertained first value and the ascertained second value exceeds a predetermined threshold value.

The vehicle according to the application comprises the advantages already mentioned in the context of the method according to the application which are not repeated here in order to avoid repetitions.

The at least one driver assistance system is selected from a parking aid system, a braking assistant, an emergency braking system, a cruise control system and a proximity control system.

The position-determining device, in one embodiment, is part of a navigation system and/or a vehicle-to-infrastructure communication device of the vehicle.

The vehicle may be a motor vehicle, in particular a passenger car or a lorry.

Furthermore the application relates to a computer program product which, if executed on a computer of the vehicle, instructs the computer to perform the following steps. The computer is instructed to ascertain a first value of a distance which the vehicle traveled within a time interval based on data ascertained by at least one first revolution sensor of a first tire and a second revolution sensor of a second tire of the vehicle. In addition, the computer is instructed to ascertain a second value of a distance which the vehicle traveled within a time interval based on data ascertained by a position-determining device. Furthermore the computer is instructed to compare the ascertained first value and the ascertained second value. If a deviation between the ascertained first value and the ascertained second value exceeds a predetermined threshold value, the computer is instructed to classify a speed determined based on the ascertained second value as the intrinsic speed of the vehicle and to provide the determined speed to at least one driver assistance system of the vehicle.

Moreover the application relates to a computer-readable medium on which a computer program product according to the embodiment is stored.

The computer program product and the computer-readable medium according to the application comprise the advantages already mentioned in the context of the method according to the application, which advantages will therefore not be repeated here in order to avoid repetitions.

BRIEF DESCRIPTION OF THE FIGURES

The present disclosure will hereinafter be described in conjunction with the following figures, wherein like numerals denote like elements.

DETAILED DESCRIPTION

The following detailed description is merely exemplary in nature and is not intended to limit the disclosure or the application and uses of the disclosure. Furthermore, there is no intention to be bound by any theory presented in the preceding background or the following detailed description.

Figure 1:
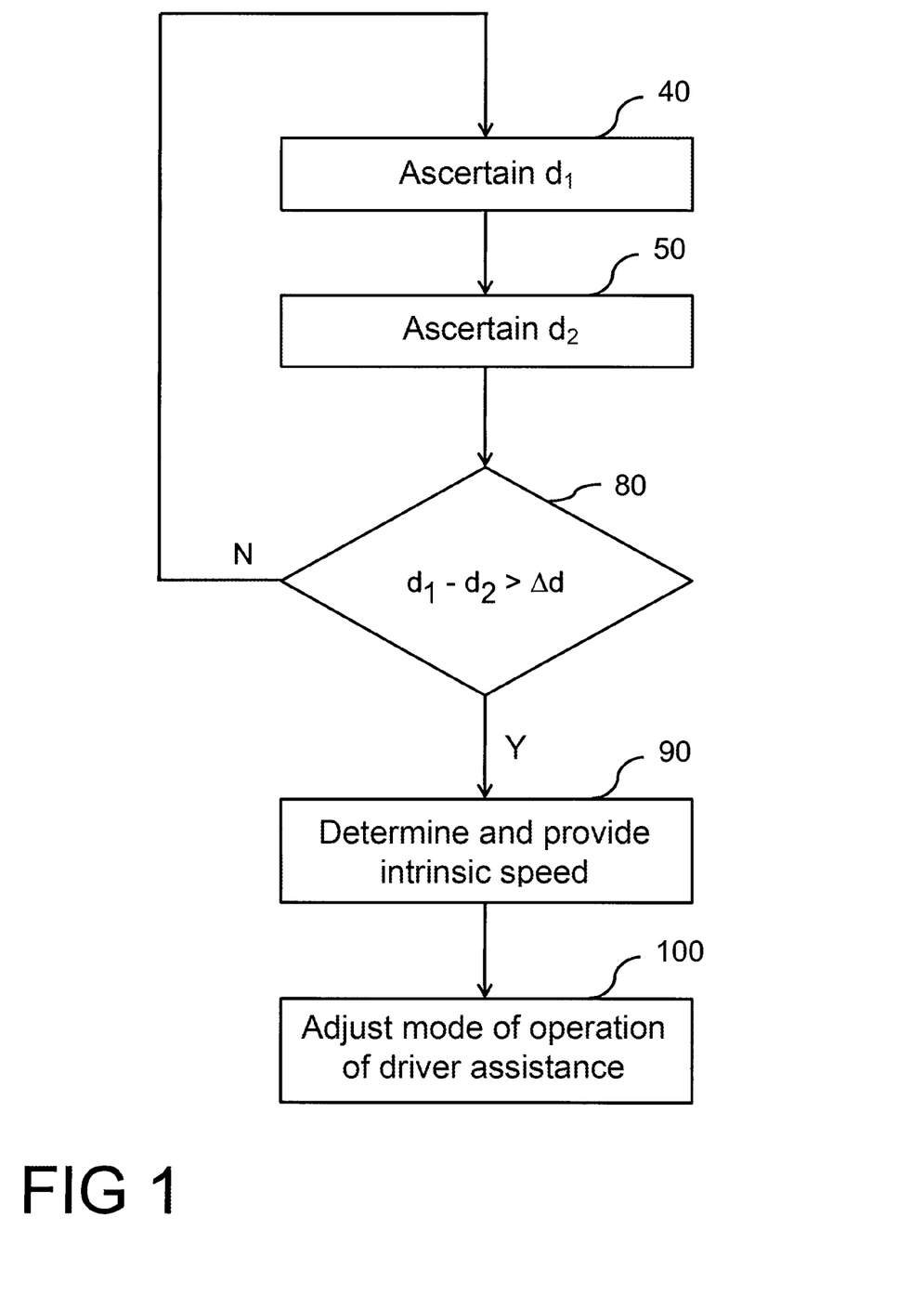
FIG. 1 is a flow diagram of a method for determining a speed of vehicle according to a first embodiment of the application.

FIG. 1 is a flow diagram of a method for determining a speed of vehicle according to a first embodiment of the application. The vehicle is, for example, a motor vehicle, in particular a passenger car or a lorry.

A first step 40 includes ascertaining a first value $d_1$ of a distance the vehicle has traveled within a time interval based on data ascertained by at least one revolution sensor of a first tire of the vehicle and a second revolution sensor of a second tire of the vehicle. Ascertaining the first value may include forming a mean value from the data ascertained by the at least one first revolution sensor and the second revolution sensor. Further, if each of the tires of the vehicle comprises a revolution sensor, ascertaining the first value may be affected based on data ascertained from all revolution sensors of all tires of the vehicle. The first value $d_1$ is determined by multiplying the revolution ascertained in the time interval with a predetermined value for the circumference of the tires.

A first step 50 executed simultaneously with step 40 includes ascertaining a second value $d_2$ of the distance the vehicle has traveled in the time interval based on data ascertained by a position-determining device. The position-determining device may determine a position of the vehicle in a satellite-based manner and/or on the basis on data ascertained from a vehicle-to-infrastructure communication device. The distance traveled by the vehicle within the time interval may then be determined from the ascertained position data.

A step 80 includes comparing the ascertained first value $d_1$ with the ascertained second value $d_2$. In the embodiment shown the difference is formed between $d_1$ and $d_2$ and a check is carried out as to whether the deviation between the ascertained first value and the ascertained second value exceeds a predetermined threshold value $\Delta d$, i.e. it is ascertained whether the relationship $d_1-d_2>\Delta d$ is valid.

If in step 80 it is determined that the deviation between the ascertained first value $d_1$ and the ascertained second value $d_2$ does not exceed the predetermined threshold value $\Delta d$, steps 40, 50 and 80 are repeated. In addition, a speed determined on the basis of the ascertained first value (i.e. a speed determined by means of the vehicle's own sensors) may be classified as the intrinsic speed of the vehicle. In addition, the determined speed may be provided to at least one driver-assistance-system of the vehicle.

If, on the other hand, it is determined in step 80 that the deviation between the ascertained first value and the ascertained second value exceeds a predetermined threshold value, a speed is determined in step 90 on the basis of the ascertained second value and this is classified as the intrinsic speed of the vehicle. In addition, the determined speed is provided to at least one driver-assistance-system of the vehicle. In a further implementation the speed based on the ascertained second value is determined immediately following step 50 (i.e. prior to comparing the ascertained first value $d_1$ with the ascertained second value $d_2$).

The driver assistance system can be selected from a parking aid system, a braking assistant, an emergency braking system, a cruise control system and a proximity control system.

Furthermore in the shown first embodiment the mode of operation of the at least one driver assistance system is adjusted in step 100 as a function of the deviation between the ascertained first value $d_1$ and the ascertained second value $d_2$. For example the operation of the driver assistance system is restricted if the predetermined threshold value is exceeded.

Figure 2:
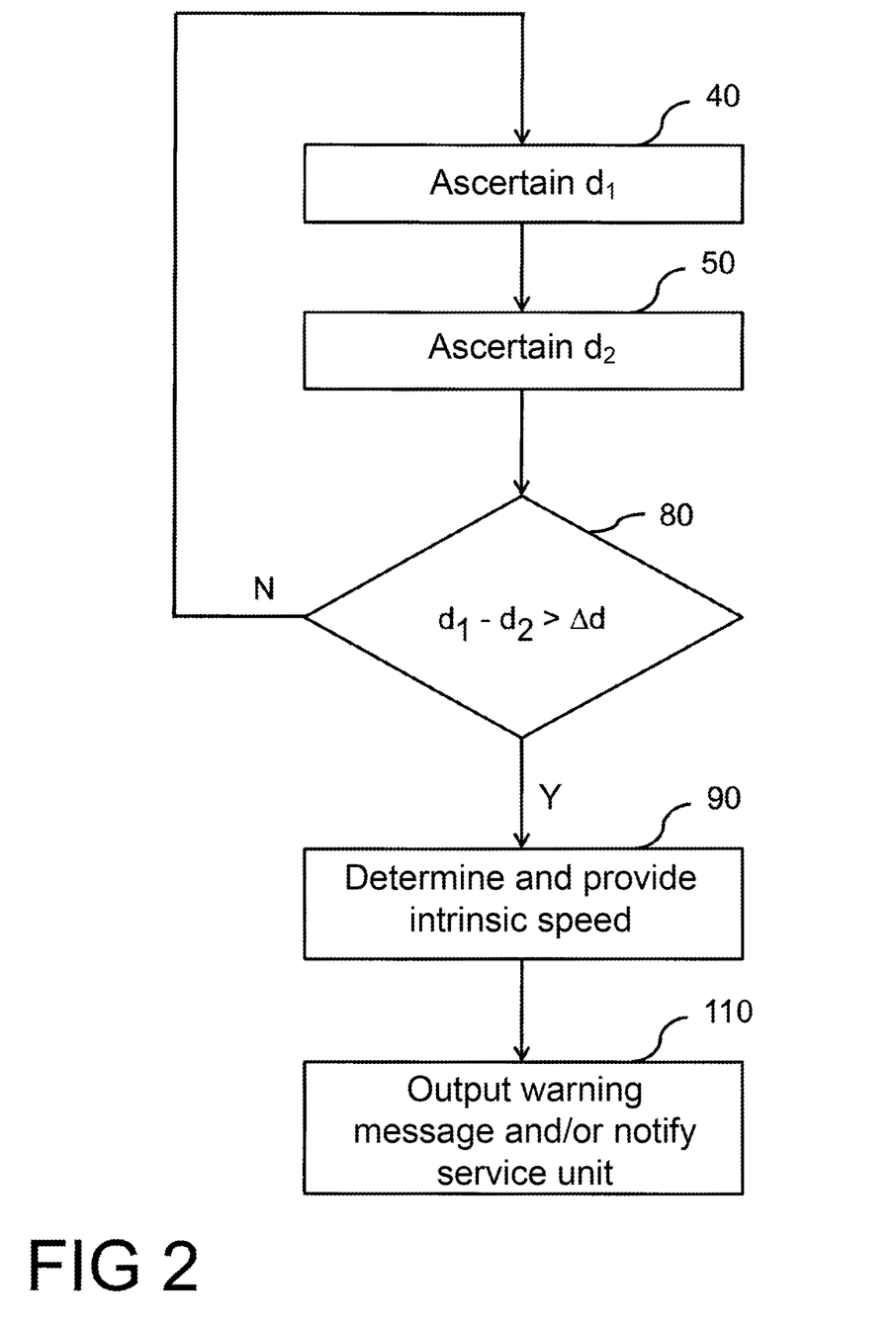
FIG. 2 is a flow diagram of a method for determining a speed of vehicle according to a second embodiment of the application.

FIG. 2 shows a flow diagram of a method for determining the speed of a vehicle according to a second embodiment of the application. The vehicle may be a passenger car, for example.

In a step 40 a first value $d_1$ of a distance traveled by the vehicle within a time interval is ascertained based on data ascertained by at least one first revolution sensor of a first tire of the vehicle and a second revolution sensor of a second tire of the vehicle, corresponding to step 40 in the embodiment shown in FIG. 1.

In addition in a simultaneously performed step 50 a second value $d_2$ is ascertained based on data ascertained by a position-determining device of a distance traveled in the time interval, corresponding to step 50 in the first embodiment shown in FIG. 1.

In a step 80 the ascertained first value $d_1$ and the ascertained second value $d_2$ are compared, wherein in the embodiment shown it is again determined whether the relationship $d_1-d_2>\Delta d$ is valid.

If the deviation between the ascertained first value $d_1$ and the ascertained second value $d_2$ does not exceed a predetermined threshold value, steps 40, 50 and 80 are repeated.

If, however, the deviation between the ascertained first value $d_1$ and the ascertained second value $d_2$ exceeds a predetermined threshold value, a speed is determined in a step 90 on the basis of the ascertained second value and thus the determined speed is classified as the intrinsic speed of the vehicle. In addition, the determined speed is provided to at least one driver-assistance-system of the vehicle.

In the second embodiment shown a step 110 is further performed for outputting a warning message, for example an acoustic and/or optical warning message, in case the deviation between the ascertained first value $d_1$ and the ascertained second value $d_2$ exceeds the predetermined threshold value $\Delta d$. In addition or alternatively, a servicing company, for example a repair garage, may be notified in step 110.

Figure 3:
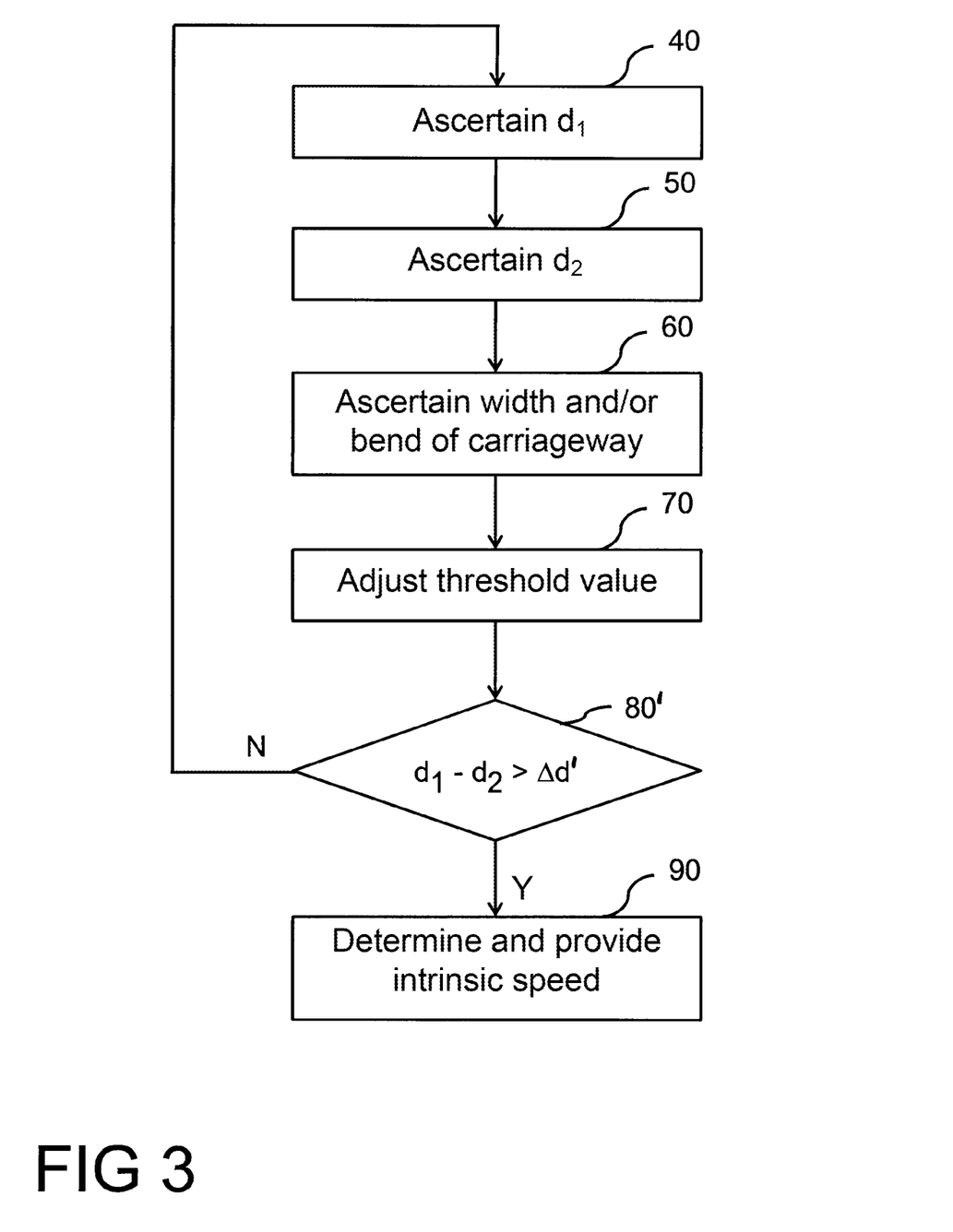
FIG. 3 is a flow diagram of a method for determining a speed of vehicle according to a third embodiment of the application.

FIG. 3 shows a flow diagram of a method for determining a speed of a vehicle according to a third embodiment of the application. Again the vehicle may be for example a motor vehicle, in particular a passenger car.

In the third embodiment shown step 40 includes ascertaining a first value $d_1$ of a distance traveled by the vehicle within a time interval, corresponding to step 40 of the first embodiment shown in FIG. 1.

Furthermore, simultaneously with step 40, step 50 includes ascertaining a second value $d_2$ of the distance traveled by a vehicle within a time interval based on data ascertained by a position-determining device, corresponding to step 50 in the first embodiment shown in FIG. 1.

In addition, in the third embodiment shown, a bend and/or a width of the carriageway traveled by the vehicle is ascertained in step 60, for example by means of data ascertained by at least one optical camera of the vehicle and/or by means of map data stored in a storage device.

In a step 70 the predetermined threshold value is adjusted as a function of the ascertained bend and/or the ascertained width of the carriageway.

In a step 80' the ascertained first value $d_1$ is compared with the ascertained second value $d_2$, wherein in the third embodiment shown it is determined, whether the relationship $d_1-d_2>\Delta d'$ is valid, wherein $\Delta d'$ stands for the adjusted threshold value.

If it is ascertained in step 80' that the deviation between the ascertained first value $d_1$ and the ascertained second value $d_2$ does not exceed a predetermined threshold value $\Delta d'$, steps 40, 50, 60, 70 and 80' are repeated.

If, however, it is ascertained that the deviation between the ascertained first value $d_1$ and the ascertained second value $d_2$ exceeds a predetermined threshold value $\Delta d'$, a speed based on the ascertained second value $d_2$ is determined in step 90 and this speed is classified as the intrinsic speed of the vehicle. In addition, the determined speed is provided to at least one driver assistance system.

By means of the embodiments shown it is thus possible to ascertain in an advantageous manner, whether possibly an erroneously wrong calculation method or formula or calibration for ascertaining the distance traveled based on the sensors used in the vehicle is employed in the vehicle.

Faulty measurements may, for example, occur due to a tire change, if recently fitted tires, for example due to the tire type or wear condition have a circumference differing from previously used tires, where the circumference served as a basis for the calculation method of the distance traveled. If the change in tire circumference or radius was not taken into account in the method or formula or calibration for calculating the distance traveled, the speed limit values for driver assistance systems, for example for a parking aid system or in particular a camera-based and/or radar-based emergency braking system may be faulty. This might mean that safety systems are active at vehicle speeds for which they are not designed, for example if the circumference of the currently used tires is larger than the circumferential value on which the calculation of the distance traveled is based.

The methods mentioned permit the ascertainment of tires with an inappropriate or unsuitable circumference, for example of wrong size tires, including in particular, when all tires of the vehicle were simultaneously replaced by tires of the wrong size. A tire change may, in particular, occur when changing from winter to summer tires and vice versa. A comparison is performed between a travel distance estimate based on vehicle-external systems such as satellite-based positioning systems i.e. GPS or the like, or stationary systems based on vehicle-to-infrastructure communication, and a travel distance estimate based on the vehicle's own systems using individual wheel speed signals or rotational speed signals. If in the comparison the deviation exceeds a predetermined threshold value, this may be interpreted as an indication for a potentially wrong tire size or used to notify in particular the driver of the vehicle and/or an external servicing or rescue outfit.

Figure 4:
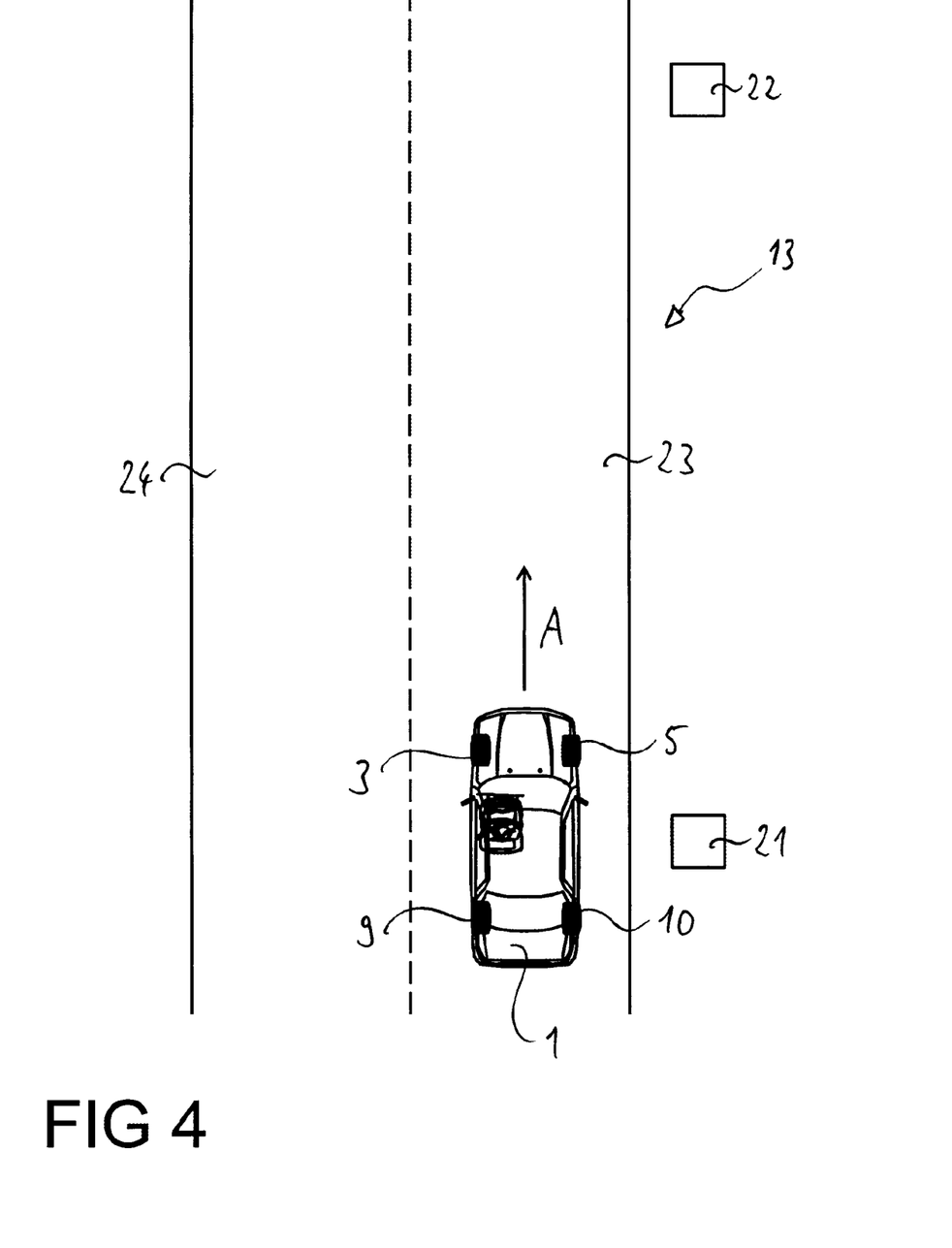
FIG. 4 is an example of a driving situation, in which the method according to the application can be used.

FIG. 4 shows an example of a driving situation, in which the method according to the embodiments of the application, in particular the methods according to the embodiments of FIGS. 1 to 3 can be used.

In the driving situation shown a vehicle 1, which in the situation shown is a passenger vehicle, drives in a driving direction schematically represented by arrow A along a first lane 23 on a carriageway 13. The carriageway 13 comprises a further lane 24 in addition to the first lane 23.

A distance traveled by the vehicle 1 within a time interval is determined based on data which are ascertained by revolution sensors not shown in detail in FIG. 4, wherein each of the tires 3, 5, 9 and 10 of vehicle 1 has one revolution sensor, respectively, associated with it.

Furthermore a second value of the distance traveled by the vehicle 1 in the time interval is ascertained based on data ascertained by a position-determining device of vehicle 1 not shown in detail. The position-determining device of vehicle 1 can determine the position of vehicle 1 based on a satellite system. Furthermore the position-determining device can determine the position of vehicle 1 based on data received from a vehicle-to-infrastructure communication device. The vehicle-to-infrastructure communication device of vehicle 1 receives the data from infrastructure devices 21 and 22 disposed adjacent to the carriageway 13 and known as road side units (RSU). The infrastructure devices 21 and 22 transmit their respective position thus allowing a position of vehicle 1 to be determined when this vehicle passes the corresponding the infrastructure device.

As will be explained in detail in conjunction with the following FIG. 5, this permits determination of a speed of vehicle 1 from which can be derived an indication of a possibly existing unsuitable size of tires 3, 5, 9 and 10.

Figure 5:
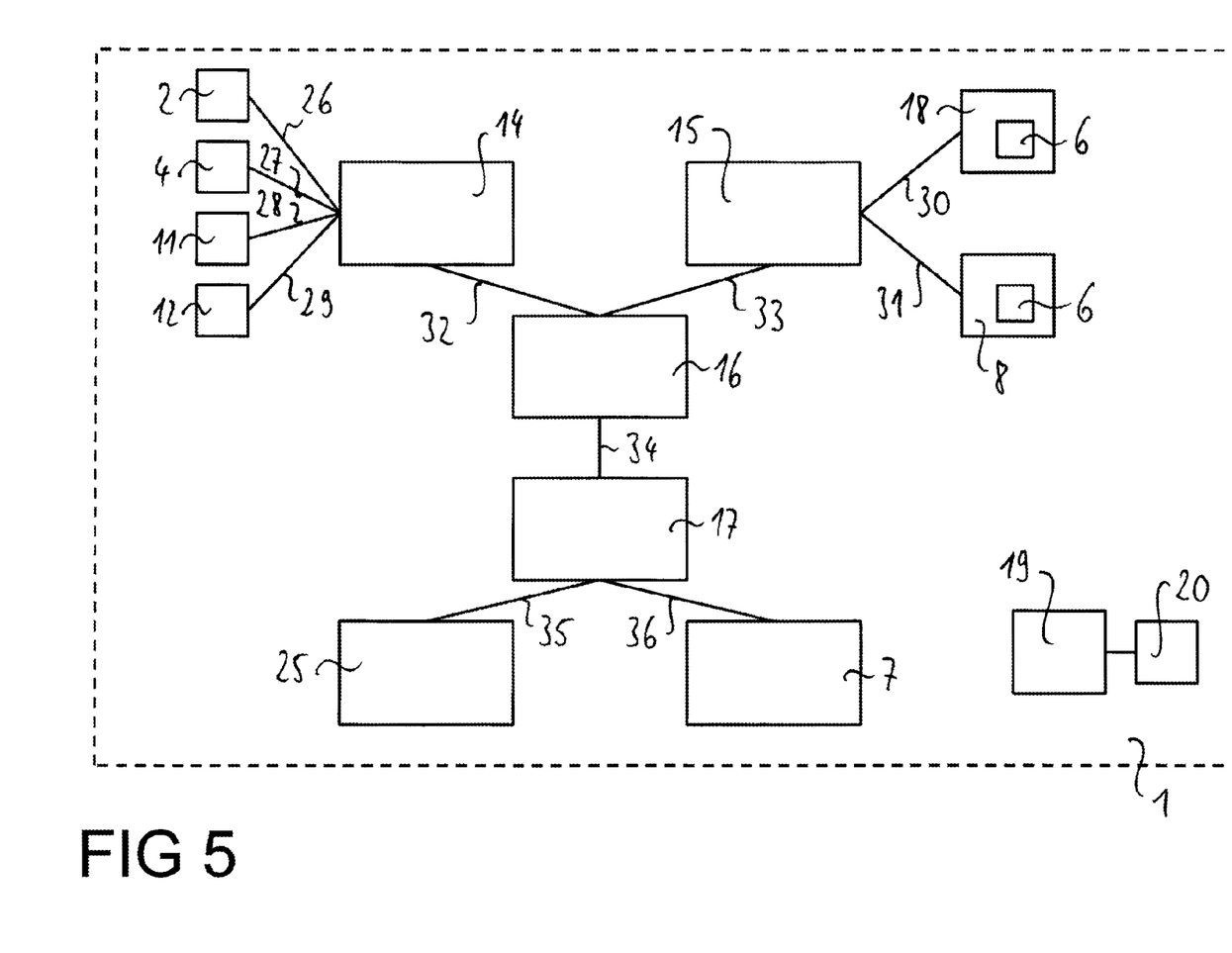
FIG. 5 is a vehicle according an embodiment of the application.

FIG. 5 shows a schematic drawing of vehicle 1 according to an embodiment of the application. The tires of vehicle 1 are therefore not shown in detail in FIG. 5.

Vehicle 1 comprises a first revolution sensor 2, a second revolution sensor 4, a third revolution sensor 11 and a fourth revolution sensor 12, wherein one of the revolution sensors is respectively associated with one tire of vehicle 1. The revolution sensors 2, 4, 11 and 12 are designed for ascertaining the number of revolutions of the respective tires.

In addition the vehicle 1 comprises a first ascertainment device 14 which is designed for ascertaining a first value of a distance traveled by vehicle 1 within a time interval based on data ascertained by the revolution sensors 2, 4, 11 and 12. The first ascertainment device 14 is connected via a signal line 26 with the first revolution sensor 2, via a signal line 27 with the second revolution sensor 4, via a signal 28 with the third revolution sensor 11 and via a signal line 29 with the fourth revolution sensor 12. For example, the ascertainment device 14 may be designed to ascertain a mean value from the revolution values ascertained by the revolution sensors 2, 4, 11 and 12.

Moreover vehicle 1 comprises a second ascertainment device 15 which is designed for ascertaining a second value of the distance traveled by vehicle 1 within a time interval. The second ascertainment device 15 is designed to ascertain a second value based on data ascertained by a first position-determining device 6 which is part of a navigation system 18 of vehicle 1 and a second position-determining device 6 which is part of a vehicle-to-infrastructure communication device 8 of vehicle 1. To this end the second ascertainment device 15 is connected via a signal line 30 with the navigation system 18 and via a signal line 31 with the vehicle-to-infrastructure communication device 8.

Furthermore the vehicle 1 comprises a comparison device 16 which is designed for comparing the ascertained first value with the ascertained second value. The comparison device 16 is connected via a signal line 32 with the first ascertainment device 14 and via a second signal line 33 with the second ascertainment device 15.

Further, the vehicle 1 comprises a classification device 17 which is designed for classifying a speed determined based on the second ascertained value as the intrinsic speed of vehicle 1 and for providing the determined speed to a driver assistance system, if a deviation between the ascertained first value and the ascertained second value exceeds a predetermined threshold value. The classification device 17 is connected via signal line 34 with the comparison device 16 and via a signal line 36 with the driver assistance system 7.

The driver assistance system 7 is, for example, selected from a parking aid system, a braking assistant, an emergency braking system, a cruise control system and a proximity control system.

Further, the classification device 17 in the embodiment shown is connected via a signal line 35 with a warning device 25, wherein by means of the warning device 25 an optical and/or acoustic warning message for example can be output, if a deviation between the ascertained first value and the ascertained second value exceeds a predetermined threshold value.

The vehicle 1 in the shown embodiment comprises a computer 19 and a computer-readable medium 20, wherein a computer program product is stored on the computer-readable medium 20 which when executed on the computer 19, instructs the computer to execute the steps mentioned in conjunction with the embodiments of the method according to the application, in particular the steps of the embodiments shown in FIGS. 1 to 3, by means of the elements mentioned therein. To this end the computer 19 is connected in a manner not shown in detail, directly or indirectly with the corresponding elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the disclosure as set forth in the appended claims and their legal equivalents.

What is claimed is:

1. A method for determining a speed of a vehicle, comprising:
   ascertaining a first distance travelled by the vehicle within a time interval on the basis of data ascertained by at least one first revolution sensor of a first tire of the vehicle and a second revolution sensor of a second tire of the vehicle;

ascertaining a second distance travelled by the vehicle within the time interval on the basis of data ascertained by a position-determining device;
determining, by a vehicle computer, that a deviation between the ascertained first distance and the ascertained second distance exceeds a predetermined threshold value; and
in response to the determining,
classifying, by the vehicle computer, a speed of the vehicle on the basis of the ascertained second distance as the intrinsic speed of the vehicle,
providing a determined speed of the vehicle to at least one driver-assistance-system of the vehicle, and
adjusting an operating mode of at least one driver assistance system as a function of the deviation between the ascertained first distance and the ascertained second distance.

2. The method according to claim 1, wherein the at least one driver assistance system is selected from a parking aid system, a braking assistant, an emergency braking system, a cruise control system and a proximity control system.

3. The method according to 1, further comprising outputting a warning message when the deviation between the ascertained first distance and the ascertained second distance exceeds the predetermined threshold value.

4. The method according to claim 1, further comprising notifying a servicing company when the deviation between the ascertained first distance and the ascertained second distance exceeds the predetermined threshold value.

5. The method according to claim 1, wherein the position-determining device ascertains a position of the vehicle in a satellite-based manner.

6. The method according to claim 1, wherein the position-determining device determines a position of the vehicle on the basis of data received by a vehicle-to-infrastructure communication device.

7. The method according to claim 1, wherein the ascertaining the first distance includes forming a mean value of the data ascertained from the at least one first revolution sensor and the second revolution sensor.

8. The method according to claim 1, wherein each of the tires of vehicle comprises a revolution sensor and wherein the ascertaining the first distance is effected on the basis of data ascertained from the revolution sensors of the tires of vehicle.

9. The method according to claim 1, further comprising ascertaining at least one of a bend and a width of the carriageway and wherein the predetermined threshold value is adjusted as a function of the ascertained at least one of the bend and the ascertained width.

10. A vehicle, comprising:
a first revolution sensor for a first tire and a second revolution sensor for a second tire of the vehicle a first ascertainment device that ascertains a first distance travelled by the vehicle within a time interval on the basis of data ascertained by at least one of the first revolution sensor and the second revolution sensor;
a second ascertainment device that ascertains a second distance travelled by the vehicle within a time interval on the basis of data ascertained by a position-determining device;
a classification device that
classifies a speed determined on the basis of the ascertained second distance as the intrinsic speed of the vehicle and
provides a determined speed of the vehicle to at least one driver assistance system of the vehicle,
when a deviation between the ascertained first distance and the ascertained second distance exceeds a predetermined threshold value; and
wherein the driver assistance system adjusts an operating mode of at least one driver assistance system as a function of the deviation between the ascertained first distance and the ascertained second distance.

11. The vehicle according to claim 10, wherein the at least one driver assistance system is selected from at least one of a parking aid system, a braking assistance, an emergency braking system, a cruise control system and a proximity control system.

12. The vehicle according to claim 10, wherein the position-determining device is part of at least one of a navigation system and a vehicle-to-infrastructure communication device of the vehicle.

13. A computer program product comprising:
a tangible storage medium readable by a processing circuit and storing instructions for execution by the processing circuit for performing a method comprising:
ascertaining a first distance travelled by the vehicle within a time interval on the basis of data ascertained by at least one first revolution sensor of a first tire of the vehicle and a second revolution sensor of a second tire of the vehicle;
ascertaining a second distance travelled by the vehicle within the time interval on the basis of data ascertained by a position-determining device;
determining that a deviation between the ascertained first distance and the ascertained second distance exceeds a predetermined threshold value; and
in response to the determining,
classifying a speed of the vehicle on the basis of the ascertained second distance as the intrinsic speed of the vehicle,
providing a determined speed of the vehicle to at least one driver-assistance-system of the vehicle, and
adjusting an operating mode of at least one driver assistance system as a function of the deviation between the ascertained first distance and the ascertained second distance.

* * * * *